(12) United States Patent
Geib

(10) Patent No.: US 6,297,201 B1
(45) Date of Patent: Oct. 2, 2001

(54) HYDROCARBON GELLING COMPOSITIONS USEFUL IN FRACTURING FORMATION

(75) Inventor: George Gregory Geib, Liberty, SC (US)

(73) Assignee: Ethox Chemicals INC, Greenville, SC (US)

( * ) Notice: Subject to any disclaimer, the term of this patent is extended or adjusted under 35 U.S.C. 154(b) by 0 days.

(21) Appl. No.: 09/571,072

(22) Filed: May 15, 2000

Related U.S. Application Data

(60) Division of application No. 09/321,823, filed on May 28, 1999, now abandoned, which is a continuation-in-part of application No. 08/596,080, filed on Feb. 6, 1996, now Pat. No. 6,149,693.

(51) Int. Cl.$^7$ .................................................. C09K 3/00
(52) U.S. Cl. ...................... 507/244; 507/246; 507/238; 507/922; 564/503; 564/506
(58) Field of Search ................................... 507/131, 133, 507/244, 246, 238, 922; 564/503, 506; 516/27

(56) References Cited

U.S. PATENT DOCUMENTS

| | | | |
|---|---|---|---|
| 5,009,799 * | 4/1991 | Syrinek et al. ........................ | 507/131 |
| 5,110,485 * | 5/1992 | Huddleston ............................ | 507/238 |
| 5,271,464 * | 12/1993 | McCabe ................................. | 507/244 |
| 5,417,287 * | 5/1995 | Smith et al. ........................... | 507/244 |
| 5,647,900 * | 7/1997 | Smith et al. ........................... | 507/238 |
| 5,710,110 * | 1/1998 | Cooperman et al. ................. | 507/131 |
| 6,054,417 * | 4/2000 | Graham et al. ....................... | 507/244 |

* cited by examiner

*Primary Examiner*—Philip Tucker
(74) *Attorney, Agent, or Firm*—Isaac A. Angres

(57) ABSTRACT

The invention relates to compositions and methods for gelling liquid hydrocarbons by the introduction of certain phosphate esters, a crosslinking agent, and an enhancer. The enhancer of the present invention is preferably an oxyalkylated amine or a blend of an oxyalkylated amine with another amine or a non-nitrogen-containing component. Mixed phosphate esters containing an oxyalkylene group are useful in the practice of the invention. Gel-forming compositions for addition to liquid hydrocarbons, as well as methods for forming fracturing fluids, are encompassed. The present compositions and methods are an improvement in the field of hydrocarbon gelling, e.g., in fracturing formations, by providing more rapid gellation and greater viscosities.

3 Claims, No Drawings

HYDROCARBON GELLING COMPOSITIONS USEFUL IN FRACTURING FORMATION

This application is a divisional of U.S. Ser. No. 09/321,823 filed May 28, 1999, now abandoned, which is a continuation-in-part of U.S. Ser. No. 08/596,080 filed Feb. 6, 1996, and now U.S. Pat. No. 6,149,693.

FIELD OF THE INVENTION

The present invention is directed to the improved gellation of hydrocarbons liquids for a variety of applications. The present invention is specifically directed to an enhancer for improving the gelling of hydrocarbon liquids when treated with phosphate esters and crosslinking agents.

BACKGROUND OF THE INVENTION

In order to maximize the amount of oil derived from an oil well a process known as hydraulic pressure stimulation or, more commonly, formation fracturing is often employed. In formation fracturing, fluid is pumped under high pressure down the wellbore through a steel pipe having small perforations in order to create or perpetuate cracks in the adjacent subterranean rock formation. The fluid employed must be able to withstand exceptionally high shear forces. Gelled liquids, and particularly gelled hydrocarbons, are well-suited for this application. The fracturing fluid has entrained therein a particulate material called a proppant (e.g., sand or other particulate matter). The proppant particles become wedged in the cracks of the formation to keep the cracks open once the external pressure is released, thereby enabling continued production stimulation of the well. It is ideal from the vantage points of time economy and cost-savings to have the gelling of the hydrocarbon take place more or less continuously on-site or "on the fly" as the components are brought together as they are pumped down the well bore. Accordingly, it is both desirable and adavatageous that gellation occur as quickly as possible.

The viscosity of the hydrocarbon gel is important for proppant transport. Poor gel viscosity can lead to a phenomenon known as "screening out", whereby the gel is not sufficiently capable of suspending the proppant. Large quantities of proppant material, upwards of 3 to 15 pounds of sand per gallon of pumping fluid, can settle out inside the well bore, as well as in the fracture. If the proppant has dropped, or screened out, part of the created fracture is effectively closed when the external pressure is released. When screening out occurs, the fracturing process must be interupted and the well bore cleaned out, costing both significant time and expense.

Rapid gellation of hydrocarbon liquids is also beneficial when tanks or vessels carrying such liquids are damaged during transport and cause highly hazardous and environmentally damaging spillage. A fast gelling additive composition that can be added to the leaking volume of hydrocarbon liquid would serve to prevent or, at least, reduce or contain the spillage and the resultant damage. A variety of other applications exist which require the rapid gellation of hydrocarbon liquids, and to which the present invention would apply.

Several means for gelling hydrocarbon liquids are disclosed in the prior art. U.S. Pat. No. 5,417,287 to Smith et al. is directed to a method for fracturing a subterranean formation which involves adding to a hydrocarbon liquid (a) an organic phosphate of the formula $HPO_4RR'$ where R is an alkyl or alkaryl group having from 6 to 18 carbon atoms and R' is hydrogen or an aryl, alkaryl or alkyl group having from 1 to 18 carbon atoms; and (b) a ferric salt.

Smith et al 5,614,010 teaches gelling agents suitable for use in methods of fracturing formations, comprising ferric salts, certain phosphate esters, a low molecular weight amine such as triethanolamine or triethylamine, and an optional surfactant. Smith '010, however, does not achieve, e.g., the impressive hydrocarbon viscosities achievable by the present methods and compositions, and moreover Smith uses twice as much phosphate ester and ferric ion as required herein.

Smith et al U.S. Pat. No. 5,647,900 discloses gelling agents for hydrocarbon gels comprising combinations of certain orthophosphate esters and a composition comprising a source of ferric ions, a $C_2$–$C_{12}$ amine, and a polycarboxylic acid or salt thereof. However, the gels formed in the Smith et al inventions demonstrate lower (Marsh funnel) viscosities than those achieved by the gels of the present invention. Moreover, the Smith et al gels are formed using twice as much phosphate ester and ferric ion (1% of each relative to the volume of liquid hydrocarbon to be gelled) as compared to the invention as demonstrated, e.g., in the Examples of the invention.

European Patent Application No. 551021A1 to McCabe et al. is directed to gelling a hydrocarbon liquid by adding thereto an at least partially neutralized alkyl orthophosphate acid ester, a $C_8$–$C_{18}$ surface active amine and $C_2$–$C_4$ monohydric alcohol. The surface active amine employed includes alkyl and alkanol amines having from about 8–18 carbon atoms, N-heterocyclic amines, alkyl substituted derivatives of such heterocyclics and mixtures thereof. Amines having more than one nitrogen group are preferred and imidazoline, such as that prepared from the reaction of a tall oil fatty acid with diethylenetriamine, is most preferred.

U.S. Pat. No. 4,316,810 to Burnham is directed to a fracturing composition which is an aluminum salt of an oxaalkyl phosphate in an oil base liquid. Surface active agents are not disclosed.

U.S. Pat. No. 4,153,649 to Griffin is directed to the reaction product of a hydroxy ether and a pentavalent phosphorus compound and an alcohol. The hydroxy ether has the formula $ROR_1OH$ wherein R is a $C_1$ to $C_6$ alkyl group, $R_1$ is a $C_2$ or $C_3$ alkylene group and the total carbon atoms of $R_1$ and R range from 3 to about 8. The disclosed reaction product may be employed in the gelling of hydrocarbon liquids when used with a compound containing a multivalent metal cation.

U.S. Pat. No. 5,271,464 to McCabe is directed to a method of plugging or sealing a subterranean formation by introducing a rapidly gelling hydrocarbon thereto. To the hydrocarbon is added a first component which is an at least partially neutralized alkyl orthophosphate ester and a second component which is the reaction product of an aqueous source of aluminum or ferric ions and a $C_8$–$C_{18}$ surface active amine in the presence of a water miscible organic solvent. The surface active amine is as defined above for European Patent Application No. 551021A1, also to McCabe. The water miscible organic solvent is generally a monohydric alcohol.

U.S. Pat. No. 3,494,949 to Monroe et al. is directed to an additive for improving the viscosity of motor oils which is generally an aluminum salt of an alkyl orthophosphate.

U.S. Pat. No. 2,983,678 to Pellegrini et al. is directed to an additive for lubricating oils which is generally a rare earth metal salt of a diester phosphate.

U.S. Pat. Nos. 4,877,894, 5,057,233, 5,110,485, and 5,202,035 to Huddleston are related to phosphate esters as hydrocarbon gelling agents. The gelling agent is generally formed by first reacting phosphorus pentoxide with triethyl phosphate, followed by reaction with a mixed alcohol that may have a substantial hexanol component. The gelling agent may also be in the form of an aluminum salt, by reaction of the phosphate ester with aluminum sulfate in the presence of solvent. None of the gelling agents or systems of the Huddleston patents appreciate the benefit of adding an amine, e.g., oxyalkylated amine, or an amine blend enhancer in the gelling of liquid hydrocarbons. The Huddleston teachings are also devoid of appreciation of the benefits obtained by using a ferric salt.

U.S. Pat. No. 5,190,675 and EP 225,661 to Gross (Dowell Schlumberger) employ metal phosphate diesters in the gelling of liquid hydrocarbons. The metal phosphate diester is prepared by reacting a phosphorus pentoxide with a triethyl phosphate, followed by reaction with an alcohol to form the diester. The metal salt is formed in the presence of the hydrocarbon to be gelled by the addition of a non-aqueous source of aluminum, e.g., aluminum isopropoxide. The gelling agents of Gross are devoid of the presence of an amine enhancer and a crosslinking ferric salt, and accordingly, Gross' methods do not achieve the level of beneficial gelling properties achievable by the present invention.

While a variety of systems are available for gelling hydrocarbon liquids for the application discussed above, there exists a clear need in the art for a means of improving the known systems to achieve decreased gelling times and improved viscosity.

SUMMARY OF THE INVENTION

Therefore, it is one object of the present invention to provide such a means for improving known gellation systems.

It is a further object of the present invention to provide a novel gellation system exhibiting decreased gelling times and improved viscosity.

It is yet another object of the present invention to provide a composition for decreasing gelling time and improving viscosity for use in conventional methods of gelling hydrocarbon liquids.

These as well as other objects are achieved by providing a composition for improving the gelling of hydrocarbon liquids, which composition comprises an enhancer chosen from a specific class of amines, a certain class of phosphate esters, and a crosslinking agent.

Such objects are also achieved by providing a method of gelling hydrocarbon liquids which involves adding to a hydrocarbon liquid the enhancer, the phosphate ester, and the crosslinking agent.

A further object of the invention is to provide synergistic combinations of enhancers, as well as synergistic phosphate ester combinations, useful in improving the gelling of hydrocarbon liquids.

More particularly, the objects of the invention are achieved by providing a method of gelling hydrocarbon liquids which involves adding to a hydrocarbon liquid (a) a phosphate ester or a mixture of phosphate esters; (b) a crosslinking agent; and (c) an amine enhancer which is a $C_2$–$C_{22}$ amine, a $C_2$–$C_{22}$ oxyalkylated amine, or mixtures thereof.

DESCRIPTION OF THE PREFERRED EMBODIMENTS

The present invention is drawn, in part, to an enhancer for use in the gelling of hydrocarbon liquids when such a liquid is treated with a phosphate ester and a crosslinking agent. The invention is also directed to novel compositions comprising the enhancer, a phosphate ester (chosen from a specified class and to be described more fully below), and the crosslinking agent. The invention relates further still to gel compositions which results from adding to a hydrocarbon liquid the enhancer, the phosphate ester, and the crosslinking agent.

Hydrocarbon liquids which are appropriate for use in accordance with the present invention include kerosene, diesel oil and crude oil, gasoline and other aliphatic and aromatic hydrocarbons such as octane, heptane, paraffinic oils and lubricating oils. The choice of the liquid for use in accordance with the present invention will depend on the particular industrial or chemical application. In industrial applications, diesel oil is typically gelled, however other liquid hydrocarbons are also well-suited for use in the present invention. Other factors, such as accessibility and economics(cost) of liquid hydrocarbons at a particular site, dictate to a degree the choice of hydrocarbon to be gelled.

The crosslinking agent or activator employed in the practice of the invention is a salt of a multivalent cation, and is preferably the salt of a multivalent metal cation. Although a wide variety of metal salts, such as aluminum salts and rare earth metal salts, are within the scope of the present invention, ferric salts are generally preferred. Preferred ferric salts include ferric nitrate and ferric sulfate.

The phosphate ester component of the present invention can be the reaction product of a pentavalent phosphorus compound and an alcohol, and their preparation is according to well-known synthesis procedures (see, for example, Crawford et al U.S. Pat. No. 3,757,864, Poklacki U.S. Pat. No. 4,007,128, and Burnham et al U.S. Pat. No. 4,200,539, all of which are incorporated herein by reference). More preferably, the phosphate esters useful herein are the reaction product of 1) pentavalent phosphorus (e.g., $P_2O_5$) reacted with a trialkylphosphate, and 2) at least one alcohol. The synthesis of these phosphate esters takes place according to well-known procedure, for example, as set forth in Huddleston U.S. Pat. No. 5,202,035 (incorporated herein by reference). Alternatively, the phosphate esters useful in the present invention can be prepared by transesterification of orthophosphate ester with triethyl phosphate, for example, Jones et al U.S. Pat. No. 5,649,596.

More preferably, the phosphate ester is formed from $P_2O_5$ and a tri-loweralkyl phosphate when reacted with a mixture of alcohols and/or oxyalkylated alcohols yielding phosphate monoesters, symmetric diesters, asymmetric diesters, symmetric triesters, asymmetric triesters, nd mixtures of any of these. "Tri-loweralkyl phosphate" in the present context is to be understood as meaning tri-$C_1$–$C_6$ alkylphosphate. The alcohols suitable for reaction with the phosphate intermediate include alkyl alcohols, aralkyl alcohols, ether-containing alkyl alcohols, and aralkyl ether alcohols (or oxyalkylated aralkyl alcohols), and mixtures thereof. It is to be understood that the term "alkyl" as it applies to the present phosphate esters includes straight and branched alkyl groups. "Aryl" includes $C_6$ to $C_{12}$ aryl. Therefore, when ether alcohols are employed one or more oxyalkene groups such as oxyethylene, oxypropylene or oxybutylene is present in the "R" group of the alcohol designated as ROH. Accordingly, the phosphate ester that is formed is an ether phosphate ester. Thus, the term "phosphate esters" as used herein includes ether phosphate esters. The phosphate esters of the present invention will thus be mixtures of esters conforming to the following structures:

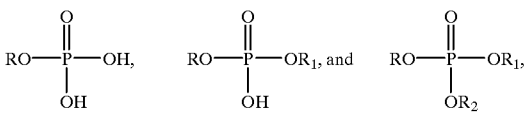

wherein R, $R_1$, and $R_2$ are independently $C_1$–$C_{18}$ alkyl, $C_6$ aryl, $C_1$–$C_{18}$ alkyl or di $C_1$–$C_{18}$ alkyl $C_6$ aryl, $C_1$–$C_{18}$ alkyl ether, $C_6$ aryl ether, or $C_1$–$C_{18}$ alkyl or di $C_1$–$C_{18}$ alkyl $C_6$ aryl ether, and where any ether linkage has the following structure:

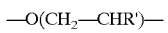

wherein R' is hydrogen, methyl or ethyl.

More preferably, the phosphate ester according to the invention is a mixture of mixed esters such as asymmetric phosphate diesters (i.e., where $R \neq R_1$). The ability to obtain particularly useful phosphate ester mixtures within the scope of the invention hinges upon the specific alkyl, alkaryl, alkyl ether, alkaryl ether, aralkyl, and/or aralkyl ether moieties in the alcohol reactants. For example, a phosphate ester mixture that contains a distribution of $C_2$, $C_8$, $C_{10}$, and oxyalkylated $C_6$ aryl groups is particularly useful herein.

The phosphate ester of the present invention is preferably non-neutralized. However, depending on the particular enhancer employed, it is also within the scope of the invention to at least partially neutralize the phosphate ester.

The enhancer of the present invention is an amine, a mixture of amines, or an amine and another non-amine compound that functions as an enhancer. The following amine structures are within the scope of the enhancer of the present invention:

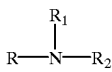

where R, $R_1$, and $R_2$ are independently hydrogen, $C_1$–$C_{18}$ alkyl, $C_5$–$C_6$ cycloalkyl, aryl, $C_1$–$C_{18}$ substituted aryl, or —(CH R'—CHO)$_n$ wherein R' is hydrogen, methyl or ethyl, n is an integer from 1 to 100, and wherein the O atom of the terminal or "$n^{th}$" —(CH R'—CHO)$_n$ group is bound to a hydrogen atom;

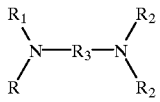

where R is hydrogen, $C_1$–$C_{18}$ alkyl, or a group of the structure

—(CH R'—CHO)$_n$— wherein R' is hydrogen, methyl or ethyl, n is an integer from 1 to 100, and wherein the O atom of the terminal or "$n^{th}$" —(CH R'—CHO)$_n$ group is bound to a hydrogen atom; $R_1$ is hydrogen, $C_1$ alkyl or a group of the structure —(CH R'—CHO)$_n$— wherein R' is hydrogen, methyl or ethyl, n is an integer from 1 to 100, and wherein the O atom of the terminal or "$n^{th}$" —(CH R'—CHO)$_n$ group is bound to a hydrogen atom; $R_2$ is hydrogen or —(CH R'—CHO)$_n$— wherein R' is hydrogen, methyl or ethyl, n is an integer from 1 to 100, and wherein the O atom of the terminal or "$n^{th}$" —(CH R'—CHO)$_n$ group is bound to a hydrogen atom; and $R_3$ is a $C_2$ or $C_3$ alkyl; or

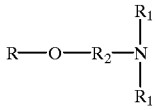

where R is $C_6$–$C_{18}$ alkyl, $R_1$ is hydrogen or a group of the structure

—(CH R'—CHO)$_n$— wherein R' and n are as defined above with respect to the diamine; and $R_2$ is a $C_3$ alkyl. With regard to amine structures shown above, the substituent group "alkyl" or "aralkyl" has the meaning of both straight and branched alkyl groups.

More preferably, the amine enhancer an oxyalkylated amine. Thus, preferred oxyalkylated amines include oxyalkylated alkyl amines such as ethoxylated alkyl amines having from 1 to about 100 moles of ethylene oxide per mole of amine and ethoxylated alkyl amines having from about 1 to about 18 carbon atoms in the alkyl group; polyoxypropylene alkyl amine having from 1 to about 100 moles of propylene oxide per mole of amine; and polyoxybutylene alkyl amine having 1 to about 100 moles of butylene oxide per mole of amine. The term "oxyalkylated alkyl amines" also encompasses oxyalkylated dialkyl amines, such as ethoxylated di $C_2$–$C_8$ alkyl amines having from 1 to about 100 moles of ethylene oxide per mole of amine; polyoxypropylene dialkyl amine having from about 1 to about 100 moles of propylene oxide per mole of amine; and polyoxybutylene dialkyl amine having from about 1 to about 100 moles of butylene oxide per mole of amine. More preferably, the term "oxyalkylated amines" means oxyalkylated diamines and oxyalkylated $C_6$ aryl amines. A particularly preferred oxyalkylated amine is N,N-di n-butyl ethanol amine, having the following structure

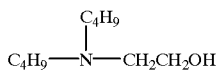

The amount of enhancer to be employed in the present compositions and methods is an amount effective to increase the rate of gel formation and to increase the viscosity thereof, relative to known gelling systems that do not incorporate an enhancer of the present invention. In general, an effective amount of amine enhancer is from 0.01% to 5.0% relative to the volume of liquid hydrocarbon to be gelled. More preferably, 0.1% to 0.5% of amine enhancer is employed.

Enhancer blends or mixtures are also appropriate for use in the present invention. Preferred blends include at least one oxyalkylated amine as set forth above with another enhancer component which is either an amine, a non-nitrogen containing compound, a quaternary nitrogen compound or an amide. It should be noted that blends containing more than two components are also within the scope of the present invention.

When a second enhancer component is another amine, this second amine may be chosen from oxyalkylated amines, such as those set forth above, or alkyl amines such as $C_2$–$C_{22}$ alkyl amines, $C_2$–$C_{22}$ dialkyl amines, $C_2$–$C_{22}$ alkyl diamines, $C_2$–$C_{22}$ dialkyl diamines. $C_2$–$C_{22}$ dialkyl amino $C_2$–$C_{22}$ alklamines, and analogs of these compounds having one or more carbon—carbon double bonds in the alkyl moiety. "Alkyl" within the context of, e.g., alkylamine, is to be understood as meaning straight and branched alkyl groups. The term "$C_2$–$C_{22}$ dialkyl" is intended to mean that each alkyl group can be from $C_2$–$C_{22}$. A preferred class of alkyl amines to be used in conjunction with an oxyalkylated amine are fatty amines, and particularly unsaturated fatty amines, such as mono- and di-oleyl amines.

Non-nitrogen containing components which are appropriate in the enhancer blend include oxyalkylated glycerides, oxyalkylated mono- and di-esters and oxyalkylated alcohols and phenols, as well as non-oxyalkylated alcohols and phenols, a fatty acid, or a mixture of a fatty acid and a glyceride.

The specific proportion or ratio of enhancer components varies depending on the nature of the individual enhancer components, as well as on the particular application requiring the gelling of liquid hydrocarbon. However, in general, when the enhancer is a blend comprising at least one oxyalkylated amine and another enhancer component, the components may be mixed at a ratio from about 9:1 to 1:9 oxyalkylated amine to other enhancer component. When it is advantageous that the enhancer be a mixture or blend of at least one oxyalkylated amine (A) and two other enhancer components (e.g., a second amine enhancer compound (B) and a non-nitrogen-containing enhancer compound (C)), the mixing ratio is from about 1:1:1 to 6:3:1 of A:B:C. Further, depending on the particular industrial application, it is within the scope of the invention to employ enhancer blends having, for example, four, five, or more enhancer components. When this is the case, the ratios of the individual components can be determined by the skilled practitioner without resort to undue experimentation.

The invention is further directed to a gel-forming hydrocarbon composition for fracturing formations comprising: 1) a hydrocarbon liquid capable of gellation, 2) 0.01 to 10.0% by weight of a phosphate ester which is a reaction product comprising either A) phosphorus pentoxide reacted with a tri-loweralkyl phosphate and subsequently reacted with either an alcohol, an oxyalkylated alcohol or mixtures thereof or B) phosphorous pentoxide reacted with either an alcohol, an oxyalkylated alcohol or mixtures thereof to form a phosphate ester or mixed phosphate ester which is subsequently reacted with a tri-loweralkyl phosphate, 3) a crosslinking agent in an amount effective to gel said hydrocarbon liquid, 4) from about 0.085 molar equivalent to about 0.31 molar equivalent of the phosphate ester of an enhancer comprising an amine selected from the group consisting of alkyl amines, oxyalkylated amines, and mixtures thereof, and 5) optionally a surfactant.

As demonstrated by several of the examples that follow, the invention includes novel synergistic combinations of enhancer components, as well as synergistic phosphate ester combinations. More specifically, the viscosities obtained (as indicated in centipoises and Marsh Funnel time (minutes)) for the present hydrocarbon gel systems using mixtures of enhancer components or mixtures of phosphate esters are greater than the viscosities of the individual components when used at comprable volumes. For example, in Table II below it will be seen that all of the enhancer mixtures have a synergistic effect on production of gels of very high viscosity (in centipoises), relative to the same volume of each of the enhancer components individually.

Particularly preferred synergistic enhancer combinations include, but are not limited to, an ethoxylated di-$C_4$ alkyl amine having one mole of oxyethylene per mole of amine in combination with any of the following oxyalkylated amines: an ethoxylated $C_{16}$-$C_{18}$ alkyl amine having two moles of oxyethylene per mole of amine; an ethoxylated $C_8$-$C_{16}$ alkyl amine having two moles of oxyethylene per mole of amine; an ethoxylated $C_{18}$ alkenyl amine having two moles of oxyethylene per mole of amine; an ethoxylated $C_{16}$-$C_{18}$ alkenyl amine having two moles of oxyethylene per mole of amine. Synergistic combinations of any of the following enhancer amines are also preferred: an ethoxylated $C_{16}$-$C_{18}$ alkyl amine having two moles of oxyethylene per mole of amine; an ethoxylated di-$C_1$ alkyl amine having one mole of oxyethylene per mole of amine; an ethoxylated di-$C_2$ alkyl amine having one mole of oxyethylene per mole of amine; triethanolamine; and an ethoxylated $C_8$-$C_{16}$ alkyl amine having two moles of oxyethylene per mole of amine.

Mixtures of phosphate esters in accordance with the invention also have a synergistic effect on gel viscosity. This feature of the invention is exemplified in Table III below. Various combinations of the following phosphate esters are effective in this particular aspect of the invention: a $C_2$, $C_8$, $C_{10}$ alkyl phosphate, having 30.3% $C_2$, 32.1% $C_8$, and 37.6% $C_{10}$; a $C_2$-$C_{18}$ alkyl, $C_1$-$C_{18}$ alkyl ether phosphate having 30.2% $C_2$, 30.3% $C_8$, 35.6% $C_{10}$, and 3.9% $C_1$ alkyl ether oxyalkylated with 1 mole of oxypropylene; a $C_2$-$C_{18}$ alkyl, $C_1$-$C_{18}$ alkyl ether phosphate having 29.7% $C_2$, 26.3% $C_8$, 30.8% $C_{10}$, and 13.2% $C_6$ alkyl ether oxyalkylated with 1.5 mole ofoxyethylene; a $C_2$-$C_{18}$ alkyl, $C_1$-$C_{18}$ alkyl ether phosphate having 30.3% $C_2$, 4.5% $C_4$, 23.8% $C_8$, 27.9% $C_{10}$, and 13.5% $C_6$ alkyl ether oxyalkylated with 1.5 moles of oxyethylene; a $C_2$-$C_{18}$ alkyl, $C_1$-$C_{18}$ alkyl ether phosphate having 27.4% $C_2$, 24.1% $C_8$, 28.4% $C_{10}$, and 20.1% $C_8$-$C_{10}$ alkyl ether oxyalkylated with 3 moles of oxyethylene; a $C_2$-$C_{18}$ alkyl, $C_1$-$C_{18}$ alkyl ether phosphate having 25.7% $C_2$, 22.7% $C_8$, 26.7% $C_{10}$, and 24.9% $C_8$-$C_{10}$ alkyl ether oxyalkylated with 5 moles of oxyethylene; a $C_2$-$C_{18}$ alkyl, $C_1$-$C_{18}$ alkyl ether phosphate having 25.4% $C_2$, 22.1% $C_8$, 26.2% $C_{10}$, and 26.3% $C_{16}$-$C_{18}$ alkyl ether oxyalkylated with 3 moles of oxyethylene; a $C_2$-$C_{18}$ alkyl, $C_6$ aryl ether phosphate having 31% $C_2$, 25% $C_8$, 30% $C_{10}$, and 14% $C_6$ aryl ether oxyalkylated with 1 mole of oxyethylene; a $C_2$-$C_{18}$ alkyl, $C_6$ aryl ether phosphate having 30.6% $C_2$, 21.6% $C_8$, 25.4% $C_{10}$, and 22.4% $C_6$ aryl ether oxyalkylated with 1 mole of oxyethylene; a $C_2$-$C_{18}$ alkyl, $C_6$ aryl ether phosphate having 25.9% $C_2$, 22.8% $C_8$, 26.8% $C_{10}$, and 24.5% $C_6$ aryl ether oxyalkylated with 6 moles of oxyethylene; a $C_2$-$C_{18}$ alkyl, $C_6$ aryl ether phosphate having 23.8% $C_2$, 21.0% $C_8$, 24.6% $C_{10}$, and 30.6% $C_6$ aryl ether oxyalkylated with 9 moles of oxyethylene; a $C_2$-$C_{18}$ alkyl, $C_6$ aryl ether phosphate having 26.2% $C_2$, 25.5% $C_8$, 29.9% $C_{10}$, and 18.5% aryl ether oxyalkylated with 10 moles of oxyethylene; a $C_2$-$C_{18}$ alkyl, $C_6$ aryl ether phosphate having 29.8% $C_2$, 26.3% $C_8$, 30.9% $C_{10}$, and 13.0% $C_6$ aryl ether oxyalkylated with 1 mole of oxybutylene; a $C_2$-$C_{18}$ alkyl, $C_1$-$C_{12}$ alkyl or dialkyl $C_6$ aryl ether phosphate having 25.2% $C_2$, 22.3% $C_8$, 26.1% $C_{10}$, and 26.4% $C_9$ alkyl $C_6$ aryl ether oxyalkylated with 4 moles of oxyethylene; and a $C_2$-$C_{18}$ alkyl, $C_1$-$C_{18}$ alkyl ether, $C_6$ aryl ether phosphate having 25.9% $C_2$, 64.7% $C_8$-$C_{10}$ alkyl ether oxyalkylated with 1 mole of oxyethylene, and 9.4% $C_6$ aryl ether oxyalkylated with 1 mole of oxyethylene. Particularly preferred phosphates ester combinations are a $C_2$, $C_8$, $C_{10}$ alkyl phosphate, having 30.3% $C_2$, 32.1% $C_8$, and 37.6% $C_{10}$ with a $C_2$-$C_{18}$ alkyl, $C_6$ aryl ether phosphate having 30.6% $C_2$, 21.6% $C_8$, 25.4% $C_{10}$, and 22.4% $C_6$ aryl ether oxyalkylated with 1 mole of oxyethylene; a $C_2$-$C_{18}$ alkyl, $C_6$ aryl ether phosphate having 31% $C_2$, 25% $C_8$, 30% $C_{10}$, and 14% $C_6$ aryl ether oxyalkylated with 1 mole of oxyethylene with a $C_2$-$C_{18}$ alkyl, $C_6$ aryl ether phosphate having 29.8% $C_2$, 26.3% $C_8$, 30.9% and 13.0% $C_6$ aryl ether oxyalkylated with 1 mole of oxybutylene; a $C_2$, $C_8$, $C_{10}$ alkyl phosphate, having 30.3% $C_2$, 32.1% $C_8$, and 37.6% $C_{10}$ with a $C_2$-$C_{18}$ alkyl, $C_6$ aryl ether phosphate having 31% $C_2$, 25% $C_8$, 30% $C_{10}$, and 14% $C_6$ aryl ether oxyalkylated with 1 mole of oxyethylene.

Especially preferred is the combination of a $C_2$, $C_8$, $C_{10}$ alkyl phosphate, having 30.3% $C_2$, 32.1% $C_8$, and 37.6% $C_{10}$ with a $C_2$-$C_{18}$ alkyl, $C_6$ aryl ether phosphate having 30.6% $C_2$, 21.6% $C_8$, 25.4% $C_{10}$, and 22.4% $C_6$ aryl ether oxyalkylated with 1 mole of oxyethylene.

EXAMPLES 1–103

The following examples set forth in Table I are representative of gelling systems in accordance with the present invention. For each of the examples below, 200 milliliters of kerosene was placed in a 500 ml Waring blender having a standard stirring assembly. The blender was plugged into a rheostat set at 30% output. The blender was started. The type and amount of activator and phosphate ester and system enhancer set forth below were added to the kerosene. Where a system enhancer was employed in accordance with the present invention, 0.10 to 0.21 milliliters were added. The blender was stirred until the vortex created from the agitator closed. If the vortex had not closed after 120 seconds, the blender was stopped at that point. The kerosene gel was then poured into a Marsh funnel viscometer. The time required for 100 milliliters of the gelled kerosene to flow through the viscometer is set forth for each example below. Brookfield viscosity measurements (in centipoises) were also taken for Examples 104–123d.

The specific components employed in each of the following examples are:

Enhancers:
Am-1: an ethoxylated $C_{16}$–$C_{18}$ alkyl amine having two moles of oxyethylene per mole of amine;
Am-2: an ethoxylated $C_8$ alkyl amine having two moles of oxyethylene per mole of amine;
Am-3: an ethoxylated di-$C_4$ alkyl amine having one mole of oxyethylene per mole of amine;
Am-4: an ethoxylated $C_{12}$–$C_{14}$ alkyloxy $C_3$ alkyl amine having three moles of oxyethylene per mole of amine;
Am-5: N,N-di-$C_1$ alkyl $C_{16}$ alkyl amine;
Am-6: N,N-di ($C_1$) alkyl $C_{18}$ alkyl amine;
Am-7: $C_{16}$–$C_{18}$ imidazoline prepared from tall oil fatty acid and diethylenetriamine;
Am-8: an alkoxylated $C_{16}$–$C_{18}$ alkyl amine having six moles of oxypropylene per mole of amine;
Am-9: an ethoxylated di-$C_4$ alkyl amine having ten moles of oxyethylene per mole of amine;
Am-10: an alkoxylated $C_{16}$–$C_{18}$ alkyl diamine having three moles of oxypropylene per mole of diamine;
Am-11: N,N-di-$C_4$ alkyl amine;
Am-12: an alkoxylated $C_{16}$–$C_{18}$ alkyl amine having two moles of oxybutylene per mole of amine;
Am-13: an alkoxylated di-$C_4$ alkyl amine having one mole of oxybutylene per mole of amine;
Am-14: an alkoxylated di-$C_4$ alkyl amine having one mole of oxypropylene per mole of amine;
Am-15: dimethylaminopropylamine;
Am-16: aminomethylpropanol;
Am-17: an ethoxylated aniline having two moles of oxyethylene per mole of benzamine;
Am-18: a $C_{16}$–$C_{18}$ alkyl diamine;
Am-19: a $C_6$ alkyl amine;
Am-20: a $C_8$ alkyl amine;
Am-21: an alkoxylated $C_{16}$–$C_{18}$ alkyl amine having two moles of oxypropylene per mole of amine;
Am-22: an ethoxylated di-$C_1$ alkyl amine having one mole of oxyethylene per mole of amine;
Am-23: an ethoxylated di-$C_4$ alkyl amine having four moles of oxyethylene per mole of amine;
Am-24: an ethoxylated di-$C_2$ alkyl amine having one mole of oxyethylene per mole of amine;
Am-25: an ethoxylated $C_{16}$–$C_{18}$ alkyl amine having five moles of oxyethylene per mole of amine;
Am-26: amino-bis (hydroxyethyl) $C_{16}$–$C_{18}$ alkyl ethosulfate (quaternized product of N,N' dihydroxyethyl $C_{16}$–$C_{18}$ alkyl amine with diethyl sulfate)
Am-27: triethanolamine;
Am-28: an ethoxylated $C_8$–$C_{16}$ alkyl amine having ten moles of oxyethylene per mole of amine;
Am-29: an ethoxylated $C_8$–$C_{16}$ alkyl amine having two moles of oxyethylene per mole of amine;
Am-30: an ethoxylated $C_{16}$–$C_{18}$ alkyl amine having twenty moles of oxyethylene per mole of amine;
Am-31: an ethoxylated $C_8$–$C_{16}$ alkyl amine having fifteen moles of oxyethylene per mole of amine;
Am-32: an ethoxylated $C_6$ cyclo amine having two moles of oxyethylene per mole of amine;
Am-33: an ethoxylated $C_{16}$–$C_{18}$ alkyl amine having thirty two moles of oxyethylene per mole of amine;
Am-34: an ethoxylated tertiary $C_4$ alkyl amine having two moles of oxyethylene per mole of amine;
Am-35: an ethoxylated $C_8$–$C_{16}$ alkanol amide having three moles of oxyethylene per mole of amine;
Am-36: a $C_8$–$C_{16}$ alkyl amine;
Am-37: an ethoxylated $C_{16}$–$C_{18}$ alkyl amine having forty moles of oxyethylene per mole of amine;
Am-38: an ethoxylated $C_{16}$–$C_{18}$ alkyl amine having fifty moles of oxyethylene per mole of amine;
Am-39: a $C_{16}$–$C_{18}$ alkyl amine;
Am-40: dimethylaminopropylamine;
Am-41: $C_6$ cyclohexylamine;
Am-42: a $C_8$–$C_{16}$ alkyl akanol amide;
Am-43: an ethoxylated $C_{16}$–$C_{18}$ alkyl amine having ten moles of oxyethylene per mole of amine;
Am-44: an ethoxylated $C_8$–$C_{16}$ alkyl amine having five moles of oxyethylene per mole of amine;
Am-45: tertiary $C_4$ alkyl amine;
Am-46: a $C_{12}$–$C_{14}$ alkoxy propyl amine;
Am-47: an ethoxylated N-ethyl toluidine having one mole of oxyethylene per mole of N-ethyl toluidine;
Am-48: an ethoxylated m-toluidine having two moles of oxyethylene per mole of m-toluidene;
Am-49: morpholine;
Am-50: an ethoxylated aniline having ten moles of oxyethylene per mole of benzamine;
Am-51: m-toluidine;
Am-52: ethylenediamine;
Am-53: an ethoxylated m-toluidine having 100 moles of oxyethylene per mole of m-toluidine;
Am-54: tetraethylene pentamine;
Am-55: an ethoxylated $C_{18}$ alkenyl amine having two moles of oxyethylene per mole of amine;
Am-56: an ethoxylated $C_{16}$–$C_{18}$ alkenyl amine having two moles of oxyethylene per mole of amine;
Am-57: isobutanolamine;
Di-es-1: a polyethylene glycol (200) di-$C_8$–$C_{16}$ ester;
Gl-1: an ethoxylated tri-$C_{18}$ alkyl glyceride having five moles of oxyethylene per mole of glyceride;
Gl-2: castor oil;
Et-1: an ethoxylated $C_{12}$–$C_{14}$ alkyl ether having three moles of oxyethylene per mole of ether;
Et-2: an ethoxylated $C_{16}$–$C_{18}$ alkenyl ether having two moles of oxyethylene per mole of ether;
Es-1: an ethoxylated unsaturated $C_{16}$–$C_{18}$ fatty acid having three moles of oxyethylene per mole of fatty acid;
Ph-1: phenol;
Ph-2: $C_5$ di-tertiary-alkyl phenol;
Ph-3: an alkoxylated $C_9$ alkyl phenol; having three moles of oxypropylene per mole of alkyl phenol
Ph-4: an alkoxylated phenol having one mole of oxybutylene per mole of phenol;
Ph-5: a tertiary-$C_5$, di-alkyl phenol;
Ph-6: a $C_9$ alkyl phenol;
Al-1: isodecyl alcohol;
Sol-1: methyl cellosolve;
Fa-1: coconut fatty acid;
Bp-1: an alkoxylated bis-phenol-a, having one mole of oxypropylene per equivalent of phenolic;

Phosphate Esters:
III(1a) (or PE-1): $C_2$, $C_8$, $C_{10}$ alkyl phosphate, having 30.3% $C_2$, 32.1% $C_8$, and 37.6% $C_{10}$;
III(2a): $C_2$–$C_{18}$ alkyl, $C_1$–$C_{18}$ alkyl ether phosphate (having 30.2% $C_2$, 30.3% $C_8$, 35.6% $C_{10}$, and 3.9% $C_1$ alkyl ether oxyalkylated with 1 mole of oxypropylene);
III(2b): $C_2$–$C_{18}$ alkyl, $C_1$–$C_{18}$ alkyl ether phosphate (having 29.7% $C_2$, 26.3% $C_8$, 30.8% $C_{10}$, and 13.2% $C_6$ alkyl ether oxyalkylated with 1.5 mole of oxyethylene);

III(2c): $C_2$–$C_{18}$ alkyl, $C_1$–$C_{18}$ alkyl ether phosphate (having 30.3% $C_2$, 4.5% $C_4$, 23.8% $C_8$, 27.9% $C_{10}$, and 13.5% $C_6$ alkyl ether oxyalkylated with 1.5 moles of oxyethylene);

III(2d): $C_2$–$C_{18}$ alkyl, $C_1$–$C_{18}$ alkyl ether phosphate (having 27.4% $C_2$, 24.1% $C_8$, 28.4% $C_{10}$, and 20.1% $C_8$–$C_{10}$ alkyl ether oxyalkylated with 3 moles of oxyethylene);

III(2e): $C_2$–$C_{18}$ alkyl, $C_1$–$C_{18}$ alkyl ether phosphate (having 25.7% $C_2$, 22.7% $C_8$, 26.7% $C_{10}$, and 24.9% $C_8$–$C_{10}$ alkyl ether oxyalkylated with 5 moles of oxyethylene);

III(2f): $C_2$–$C_{18}$ alkyl, $C_1$–$C_{18}$ alkyl ether phosphate (having 25.4% $C_2$, 22.1% $C_8$, 26.2% $C_{10}$, and 26.3% $C_{16}$–$C_{18}$ alkyl ether oxyalkylated with 3 moles of oxyethylene);

III(3a) (or EP-1): $C_2$–$C_{18}$ alkyl, $C_6$ aryl ether phosphate (having 31% $C_2$, 25% $C_8$, 30% $C_{10}$, and 14% $C_6$ aryl ether oxyalkylated with 1 mole of oxyethylene);

III(3b): $C_2$–$C_{18}$ alkyl, $C_6$ aryl ether phosphate (having 30.6% $C_2$, 21.6% $C_{8,}$ 25.4% $C_{10}$, and 22.4% $C_6$ aryl ether oxyalkylated with 1 mole of oxyethylene);

III(3c): $C_2$–$C_{18}$ alkyl, $C_6$ aryl ether phosphate (having 25.9% $C_2$, 22.8% $C_8$, 26.8% $C_{10}$, and 24.5% $C_6$ aryl ether oxyalkylated with 6 moles of oxyethylene);

III(3d): $C_2$–$C_{18}$ alkyl, $C_6$ aryl ether phosphate (having 23.8% $C_2$, 21.0% $C_8$, 24.6% $C_{10}$, and 30.6% $C_6$ aryl ether oxyalkylated with 9 moles of oxyethylene);

III(3e): $C_2$–$C_{18}$ alkyl, $C_6$ aryl ether phosphate (having 26.2% $C_2$, 25.5% $C_8$, 29.9% $C_{10}$, and 18.5% $C_6$ aryl ether oxyalkylated with 10 moles of oxyethylene);

III(3f): $C_2$–$C_{18}$ alkyl, $C_6$ aryl ether phosphate (having 29.8% $C_2$, 26.3% $C_8$, 30.9% $C_{10}$, and 13.0% $C_6$ aryl ether oxyalkylated with 1 mole of oxybutylene);

III(4a): $C_2$–$C_{18}$ alkyl, $C_1$–$C_{12}$ alkyl or dialkyl $C_6$ aryl ether phosphate (having 25.2% $C_2$, 22.3% $C_8$, 26.1% $C_{10}$, and 26.4% $C_9$ alkyl $C_6$ aryl ether oxyalkylated with 4 moles of oxyethylene);

III(5a): $C_2$–$C_{18}$ alkyl, $C_1$–$C_{18}$ alkyl ether, $C_6$ aryl ether phosphate (having 25.9% $C_2$, 64.7% $C_8$–$C_{10}$ alkyl ether oxyalkylated with 1 mole of oxyethylene, and 9.4% $C_6$ aryl ether oxyalkylated with 1 mole of oxyethylene);

Crosslinking Agents:

$Fe^{3+}$: a 60% solution of ferric sulfate;

$Al^{3+}$: a solution of an aluminum chloride tall oil imidazoline reaction product, in accordance with U.S. Pat. No. 5,271,464.

TABLE I

EXAMPLES

| Ex. | Enhancer (total vol.) | Phosphate | Salt | Closure secs. | Viscosity Mins. |
|---|---|---|---|---|---|
| 1 | None | PE-1 (1 ml) | Fe3+ (1 ml) | >120 | 0.6 |
| Comparative 2 | Am-1, Am-3 (29%/79%) (0.21 ml) | PE-1 (1 ml) | Fe3+ (0.79 ml) | 3 | 32.5 |
| 3 | Am-1, Am-3 (29%/71%) (0.21 ml) | EP-1 (1 ml) | Fe3+ (0.79 ml) | 2 | 150 |
| 4 Comparative | none | EP-1 (1 ml) | Fe3+ (1 ml) | >120 | 1.30 |
| 5(*) Comparative | none | PE-1 (0.77 ml) | Al3+ (1 ml) | 79 | 2.30 |
| 6(*) | Am-1, Am-3 (29%/71%) (0.21 ml) | PE-1 (0.77 ml) | Fe3+ (0.77 ml) | 45.7 | 39 |
| 7(*) | none | PE-1 | Fe3+ | >120 | 8.5 |
| Comparative 8 | Am-2, Am-3 (29%/71%) (0.21 ml) | PE-1 (1 ml) | Fe3+ (0.79 ml) | 30 | 95 |
| 9 | Am-5, Am-3 (29%/71%) (0.21 ml) | PE-1 (1 ml) | Fe3+ (0.79 ml) | 9 | 41.0 |
| 10 | Am-3 (0.21 ml) | PE-1 (1 ml) | Fe3+ (0.79 ml) | 45 | 14.5 |
| 11 | Am-3 (0.21 ml) | EP-1 (1 ml) | Fe3+ (0.79 ml) | 19 | >120 |
| 12 | Am-3 (0.21 ml) | III (5a) (1 ml) | Fe3+ (0.79 ml) | >120 | 4.7 |
| 13 | Am-56, Am-3 (29%/71%) (0.21 ml) | EP-1 (1 ml) | Fe3+ (0.79 ml) | 2.0 | 140.0 |
| 14 | Am-1, Am-3 (29%/71%) (0.21 ml) | III (2b) (1 ml) | Fe3+ (0.79 ml) | 5.8 | 105.0 |
| 15 | Am-1, Am-3 (29%/71%) (0.21 ml) | III (2c) (1 ml) | Fe3+ (0.79 ml) | 5.5 | 87.0 |
| 16 | Am-1, Am-3 (29%/71%) (0.21 ml) | III (2e) (1 ml) | Fe3+ (0.79 ml) | 7.5 | 33.0 |
| 17 | Am-1, Am-3 (29%/71%) (0.21 ml) | III (2d) (1 ml) | Fe3+ (0.79 ml) | 6.6 | 64.0 |
| 18 | Am-1, Am-3 (29%/71%) (0.21 ml) | III (3c) (1 ml) | Fe3+ (0.79 ml) | 21 | 30.0 |
| 19 | Am-1, Am-3 (29%/71%) (0.21 ml) | III (3b) (1 ml) | Fe3+ (0.79 ml) | 11 | 60.0 |
| 20 | Am-1, Am-3 (29%/71%) (0.21 ml) | III (4a) (1 ml) | Fe3+ (0.79 ml) | 4.7 | 141.0 |
| 21 | Am-1, Am-3 (29%/71%) (0.21 ml) | III (5a) (1 ml) | Fe3+ (0.79 ml) | 2.6 | 20.0 |
| 22 | Am-1, Am-3 (29%/71%) (0.21 ml) | III (2a) (1 ml) | Fe3+ (0.79 ml) | 9.7 | 18.0 |
| 23 | Am-1, Am-3 (29%/71%) (0.21 ml) | III (2f) (1 ml) | Fe3+ (0.79 ml) | >120 | 2.0 |
| 24 | Am-1, Am-9 (29%/71%) (0.21 ml) | EP-1 (1 ml) | Fe3+ (0.79 ml) | >120 | 50.0 |
| 25 | Am-8, Am-9 (29%/71%) (0.21 ml) | EP-1 (1 ml) | Fe3+ (0.79 ml) | >120 | 5.0 |
| 26 | Am-3, Am-10 (71%/29%) (0.21 ml) | EP-1 (1 ml) | Fe3+ (0.79 ml) | >120 | 15.5 |
| 27 | Am-1, Am-18 (25%/75%) (0.21 ml) | EP-1 (1 ml) | Fe3+ (0.79 ml) | >120 | 15.0 |
| 28 | Am-1, Am-19 (25%/75%) (0.21 ml) | EP-1 (1 ml) | Fe3+ (0.79 ml) | 23 | 197.0 |
| 29 | Am-1, Am-11 (25%/75%) (0.21 ml) | EP-1 (1 ml) | Fe3+ (0.79 ml) | 3.7 | >210 |
| 30 | Am-1, Am-20 (25%/75%) (0.21 ml) | EP-1 (1 ml) | Fe3+ (0.79 ml) | >120 | 112.0 |
| 31 | Am-21, Am-3 (25%/75%) (0.21 ml) | EP-1 (1 ml) | Fe3+ (0.79 ml) | 2.5 | 31.0 |
| 32 | Am-12, Am-3 (25%/75%) (0.21 ml) | EP-1 (1 ml) | Fe3+ (0.79 ml) | >120 | >150 |

TABLE I-continued

EXAMPLES

| Ex. | Enhancer (total vol.) | Phosphate | Salt | Closure secs. | Viscosity Mins. |
|---|---|---|---|---|---|
| 33 | Am-1, Am-3 (29%/71%) (0.21 ml) | III (3c) (1 ml) | Fe3+ (0.79 ml) | 27 | 30.0 |
| 34 | Am-1, Am-3 (29%/71%) (0.21 ml) | III (3d) (1 ml) | Fe3+ (0.79 ml) | >120 | 1.6 |
| 35 | Di-es-1, Am-3 (29%/71%) (0.21 ml) | EP-1 (1 ml) | Fe3+ (0.79 ml) | >120 | 61.0 |
| 36 | Gl-1, Am-3 (29%/71%) (0.21 ml) | EP-1 (1 ml) | Fe3+ (0.79 ml) | >120 | 74 |
| 37 | Et-1, Am-3 (29%/71%) (0.21 ml) | EP-1 (1 ml) | Fe3+ (0.79 ml) | 90 | 52 |
| 38 | Et-2, Am-3 (29%/71%) (0.21 ml) | EP-1 (1 ml) | Fe3+ (0.79 ml) | >120 | 30.0 |
| 39 | Am-21, Am-22, Sol-1 (33%:33%:33%) (0.21 ml) | EP-I (1 ml) | Fe3+ (0.79 ml) | 28 | >120 |
| 40 | Am-1, Am-23 (29%/71%) (0.21 ml) | EP-1 (1 ml) | Fe3+ (0.79 ml) | 4 | 262 |
| 41 | Am-1, Am-13 (29%/71%) (0.21 ml) | EP-1 (1 ml) | Fe3+ (0.79 ml) | 4 | 52 |
| 42 | Am-1, Am-24 (29%/71%) (0.21 ml) | EP-1 (1 ml) | Fe3+ (0.79 ml) | >120 | 170.0 |
| 43 | Am-2, Am-3 (29%/71%) (0.21 ml) | EP-1 (1 ml) | Fe3+ (0.79 ml) | 9 | 420.0 |
| 44 | Am-23 (0.21 ml) | EP-1 (1 ml) | Fe3+ (0.79 ml) | >120 | 2.3 |
| 45 | Am-3, Am-23 (25%/75%) (0.21 ml) | EP-1 (1 ml) | Fe3+ (0.79 ml) | >120 | 52.0 |
| 46 | Am-21, Am-23 (29%/71%) (0.21 ml) | EP-I (1 ml) | Fe3+ (0.79 ml) | 3 | 45.0 |
| 47 | Am-1, Am-14 (29%/71%) (0.21 ml) | EP-1 (1 ml) | Fe3+ (0.79 ml) | 3 | 240.0 |
| 48 | Am-1, Am-3 (29%/71%) (0.21 ml) | III (3f) (1 ml) | Fe3+ (0.79 ml) | 9 | 15.0 |
| 49 | Am-2, Am-23 (29%/71%) (0.21 ml) | EP-1 (1 ml) | Fe3+ (0.79 ml) | 36 | 300.0 |
| 50 | Am-1, Am-3 (29%/71%) (0.21 ml) | III (3e) (1 ml) | Fe3+ (0.79 ml) | 17 | 67.0 |
| 51 | Es-1, Am-3 (29%/71%) (0.21 ml) | EP-1 (1 ml) | Fe3+ (0.79 ml) | 90 | 88 |
| 52 | Am-4, Am-3 (29%/71%) (0.21 ml) | EP-1 (1 ml) | Fe3+ (0.79 ml) | 4.8 | 360 |
| 53 | Am-5, Am-3 (29%/71%) (0.21 ml) | EP-1 (1 ml) | Fe3+ (0.79 ml) | 2 | 900 |
| 54 | Ph-3, Am-3 (29%/71%) (0.21 ml) | EP-1 (1 ml) | Fe3+ (0.79 ml) | 90 | 85.0 |
| 55 | Am-25, Am-3 (29%/71%) (0.21 ml) | EP-1 (1 ml) | Fe3+ (0.79 ml) | >120 | 7.0 |
| 56 | Am-26, Am-3 (29%/71%) (0.21 ml) | EP-1 (1 ml) | Fe3+ (0.79 ml) | 3 | 133.0 |
| 57 | Am-8, Am-27 (50%/50%) (0.21 ml) | EP-1 (1 ml) | Fe3+ (0.79 ml) | >120 | 9.0 |
| 58 | Am-1, Am-23 (29%/71%) (0.21 ml) | EP-1 (1 ml) | Fe3+ (0.79 ml) | 4 | 262.0 |
| 59 | Am-27, Am-3 (29%/71%) (0.21 ml) | EP-1 (1 ml) | Fe3+ (0.79 ml) | 41 | 86.0 |
| 60 | Am-1, Am-8, Am-27 (33%:33%:33%) (0.21 ml) | EP-1 (1 ml) | Fe3+ (0.79 ml) | >120 | 9.5 |
| 61 | Am-21, Am-23 (29%/71%) (0.21 ml) | EP-1 (1 ml) | Fe3+ (0.79 ml) | 3 | 45.0 |
| 62 | Am-28, Am-3 (29%/71%) (0.21 ml) | EP-1 (1 ml) | Fe3+ (0.79 ml) | >120 | 6.3 |
| 63 | Am-29, Am-3 (29%/71%) (0.21 ml) | EP-1 (1 ml) | Fe3+ (0.79 ml) | 2.3 | 300.0 |
| 64 | Am-30, Am-3 (29%/71%) (0.21 ml) | EP-1 (1 ml) | Fe3+ (0.79 ml) | >120 | 1.3 |
| 65 | Am-31, Am-3 (29%/71%) (0.21 ml) | EP-1 (1 ml) | Fe3+ (0.79 ml) | >120 | 8.2 |
| 66 | Am-32, Am-3 (29%/71%) (0.21 ml) | EP-1 (1 ml) | Fe3+ (0.79 ml) | 35 | 66.0 |
| 67 | Am-33, Am-3 (29%/71%) (0.21 ml) | EP-1 (1 ml) | Fe3+ (0.79 ml) | >120 | 2.5 |
| 68* | Am-1, Am-34 (29%/71%) (0.21 ml) | EP-1 (1 ml) | Fe3+ (0.79 ml) | 120 | 35.0 |
| 69 | Ph-2, Am-3 (29%/71%) (0.21 ml) | EP-1 (1 ml) | Fe3+ (0.79 ml) | 90 | 38.0 |
| 70 | Ph-4, Am-3 (29%/71%) (0.21 ml) | EP-1 (1 ml) | Fe3+ (0.79 ml) | 93 | 80.0 |
| 71 | Ph-1, Am-3 (29%/71%) (0.21 ml) | EP-1 (1 ml) | Fe3+ (0.79 ml) | >120 | 60 |
| 72 | Am-35, Am-3 (29%/71%) (0.21 ml) | EP-1 (1 ml) | Fe3+ (0.79 ml) | 64 | 180.0 |
| 73 | Al-1, Am-3 (29%/71%) (0.21 ml) | EP-1 (1 ml) | Fe3+ (0.79 ml) | 95 | 35 |
| 74 | Fa-1, Am-3 (29%/71%) (0.21 ml) | EP-1 (1 ml) | Fe3+ (0.79 ml) | >120 | 45.0 |
| 75 | Am-42, Am-3 (29%/71%) (0.21 ml) | EP-1 (1 ml) | Fe3+ (0.79 ml) | 9 | 300.0 |
| 76 | Am-36, Am-3 (29%/71%) (0.21 ml) | EP-1 (1 ml) | Fe3+ (0.79 ml) | >120 | 75.0 |
| 77 | Gl-2, Am-3 (29%/71%) (0.21 ml) | EP-1 (1 ml) | Fe3+ (0.79 ml) | 73 | 75.0 |
| 78 | Am-37, Am-3 (29%/71%) (0.21 ml) | EP-1 (1 ml) | Fe3+ (0.79 ml) | >120 | 7.0 |
| 79 | Am-38, Am-3 (29%/71%) (0.21 ml) | EP-1 (1 ml) | Fe3+ (0.79 ml) | >120 | 1.8 |
| 80 | Am-39, Am-3 (29%/71%) (0.21 ml) | EP-1 (1 ml) | Fe3+ (0.79 ml) | 14.4 | 345.0 |

TABLE I-continued

EXAMPLES

| Ex. | Enhancer (total vol.) | Phosphate | Salt | Closure secs. | Viscosity Mins. |
|---|---|---|---|---|---|
| 81 | Am-1, Am-40 (29%/71%) (0.21 ml) | EP-1 (1 ml) | Fe3 + (0.79 ml) | 90 | 300 |
| 82 | Am-1, Am-41 (29%/71%) (0.21 ml) | EP-1 (1 ml) | Fe3 + (0.79 ml) | >120 | 163.0 |
| 83 | Ph-5, Am-3 (29%/71%) (0.21 ml) | EP-1 (1 ml) | Fe3 + (0.79 ml) | >120 | 37.0 |
| 84 | Ph-6, Am-3 (29%/71%) (0.21 ml) | EP-1 (1 ml) | Fe3 + (0.79 ml) | 90 | 76.0 |
| 85 | Bp-1, Am-3 (29%/71%) (0.21 ml) | EP-1 (1 ml) | Fe3 + (0.79 ml) | 63 | 180.0 |
| 86* | Am-1, Am-34 (29%/71%) (0.21 ml) | EP-1 (1 ml) | Fe3 + (0.79 ml) | >120 | 53.0 |
| 87 | Am-1, Am-32 (29%/71%) (0.21 ml) | EP-1 (1 ml) | Fe3 + (0.79 ml) | 9.3 | 360.0 |
| 88 | Am-43, Am-3 (29%/71%) (0.21 ml) | EP-1 (1 ml) | Fe3 + (0.79 ml) | >120 | 3.7 |
| 89 | Am-44, Am-3 (29%/71%) (0.21 ml) | EP-1 (1 ml) | Fe3 + (0.79 ml) | 7.5 | 25.0 |
| 90 | Am-1, Am-45 (29%/71%) (0.21 ml) | EP-1 (1 ml) | Fe3 + (0.79 ml) | 12 | 78.0 |
| 91 | Am-3, Am-6 (71%/29%) (0.21 ml) | EP-1 (1 ml) | Fe3 + (0.79 ml) | 3 | 720 |
| 92 | Am-46, Am-3 (25%/75%) (0.10 ml) | EP-1 (1 ml) | Fe3 + (0.90 ml) | 15 | 720 |
| 93 | Am-1, Am-47 (29%/71%) (0.21 ml) | EP-1 (1 ml) | Fe3 + (0.79 ml) | 7.5 | 180.0 |
| 94 | Am-1, Am-17 (29%/71%) (0.21 ml) | EP-1 (1 ml) | Fe3 + (0.79 ml) | 10.7 | 240 |
| 95 | Am-1, Am-48 (29%/71%) (0.21 ml) | EP-I (1 ml) | Fe3 + (0.79 ml) | 8.1 | 150.0 |
| 96 | Am-1, Am-49 (29%/71%) (0.21 ml) | EP-1 (1 ml) | Fe3 + (0.79 ml) | 90 | 120.0 |
| 97 | Am-50, Am-3 (29%/71%) (0.21 ml) | EP-1 (1 ml) | Fe3 + (0.79 ml) | 72 | 174.0 |
| 98 | Am-1, Am-51 (29%/71%) (0.21 ml) | EP-1 (1 ml) | Fe3 + (0.79 ml) | >120 | 150.0 |
| 99 | Am-1, Am-57 (29%/71%) (0.21 ml) | EP-1 (1 ml) | Fe3 + (0.79 ml) | 81 | 100.0 |
| 100 | Am-1, Am-52 (29%/71%) (0.21 ml) | EP-1 (1 ml) | Fe3 + (0.79 ml) | >120 | 46.0 |
| 101 | Am-53, Am-3 (29%/71%) (0.21 ml) | EP-1 (1 ml) | Fe3 + (0.79 ml) | >120 | 24.0 |
| 102 | Am-1, Am-54 (29%/71%) (0.21 ml) | EP-1 (1 ml) | Fe3 + (0.79 ml) | >120 | 7.0 |
| 103(*) Comparative | Am-7 | EP-1 (1 ml) | Fe3 + (0.79 ml) | >120 | 0.12 |

5(*): utilizes the aluminum system as described in US 5,271,464.
6(*) & 7(*): the phosphate esters of these examples are partially neutralized with 0.23 ml of 45% KOH.
68(*): the enhancer was pre-blended with the ferric salt.
86(*): phosphate ester, enhancer, and ferric salt were each introduced separately.
103(*): the surface active amine is as described in Halliburton, e.g., US 5,271,464 (@Col. 3, lines 1–3).

The gelling systems in accordance with the present invention demonstrate increased gelling speeds as compared to prior art systems. Of the comparative examples set forth hereinabove, only Comparative Example 5 has a gel closure time of less than 120 seconds. The majority (63%) of the examples according to the invention required far less than 120 seconds to achieve gel closure. Some inventive examples are reported as having a closure of >120 seconds. It is important to clarify that a closure time of greater than 120 seconds is not to be understood as meaning that acceptable gel viscosity was not achieved in those examples. Rather, a designation of ">120 sec." means only that there was evidence of a vortex extant in the gelled fluid after it had stirred for 120 seconds. The significance of the rapid gel closure times evidenced overall by the gel systems of the invention is that it is an indication to the skilled field worker of the time efficiency, or the rapidity of "on the fly" gelling of the system components.

The more dramatic difference between the examples of the present invention and those of the prior art can be seen in the viscosity of the gels. Increased gel viscosity is necessary for optimal proppant transport. Prior art example, Example 5, did not exceed a viscosity of 10, as measured in minutes required for 100 milliliters of gel to pass through a Marsh funnel. Also, comparative example 103, which utilized the surface active amine of Halliburton '464 as the enhancer component, gave a viscosity of 0.12 minutes. In the numerous examples representative of the invention, 54% of the inventive examples demonstrated a viscosity requiring in excess of 50 minutes, and 34% of the inventive examples demonstrated a viscosity requiring in excess of 100 minutes for 100 milliliters to pass through the funnel. Only 15% demonstrated a viscosity requiring less than 10 minutes for 100 milliliters of gel to pass through the funnel.

Inventive examples 68 and 86 provide comparative results vis-à-vis each other. Both examples used the same components for gelling kerosene, the only difference being the manner by which they were introduced to the blender. In example 68, the enhancer was pre-blended with the ferric salt; the blend was introduced to the kerosene, as was the phosphate ester. In example 86, the same enhancer, ferric salt, and phosphate ester were all introduced separately to the kerosene. The separate addition of components gave a gel of higher viscosity (53 mins.) than the method wherein the enhancer and the ferric salt were pre-blended (35 mins).

For the following examples, the same experimental procedure as in Examples 1–103 was used. Differences in volumes and ratios employed are specified in each of the examples set forth in Table II.

TABLE II

EXAMPLES 104–119: DEMONSTRATING SYNERGISTIC EFFECTS OF AMINE MIXTURES

| Ex. | Enhancer (vol. Added) & mixing ratio, where applicable | Phosphate (vol. added) | Salt | Closure Secs. | Viscosity Mins. | Viscosity Centipoises (Observed) | Calculated Viscosity Based on Relative Contribution of Each Amine Component - in Centipoises (Expected) |
|---|---|---|---|---|---|---|---|
| 104 | Am-55 (0.21 ml) | EP-1 (1 ml) | $Fe^{3+}$ (0.79 ml) | >120 | 40.0 | 4400 | |
| 105 | Am-3 (0.21 ml) | EP-1 (1 ml) | $Fe^{3+}$ (0.79 ml) | 19 | 215.0 | 10000 | |
| 106 | Am-1 (0.21 ml) | EP-1 (1 ml) | $Fe^{3+}$ (0.79 ml) | >120 | 23.0 | 4800 | |
| 107 | Am-56 (0.21 ml) | EP-1 (1 ml) | $Fe^{3+}$ (0.79 ml) | 4 | 23.0 | 5000 | |
| 108 | Am-22 (0.21 ml) | EP-1 (1 ml) | $Fe^{3+}$ (0.79 ml) | >120 | 5.0 | 7000 | |
| 109 | Am-24 (0.21 ml) | EP-1 (1 ml) | $Fe^{3+}$ (0.79 ml) | >120 | 1.5 | 4800 | |
| 110 | Am-27 (0.21 ml) | EP-1 (1 ml) | $Fe^{3+}$ (0.79 ml) | >120 | 1.5 | 150 | |
| 111 | Am-29 (0.21 ml) | EP-1 (1 ml) | $Fe^{3+}$ (0.79 ml) | >120 | 10.0 | 250 | |
| 112 | Am-55, Am-3 (29:71)(0.21 ml) | EP-1 (1 ml) | $Fe^{3+}$ (0.79 ml) | 2 | 150.0 | 10600 | 8376 |
| 113 | Am-1, Am-3 (29:71)(0.21 ml) | EP-1 (1 ml) | $Fe^{3+}$ (0.79 ml) | 2 | 135.0 | 11000 | 8492 |
| 114 | Am-56, Am-3 (29:71)(0.21 ml) | EP-1 (1 ml) | $Fe^{3+}$ (0.79 ml) | 2 | 140.0 | 9600 | 8550 |
| 115 | Am-29, Am-3 (29:71)(0.21 ml) | EP-1 (1 ml) | $Fe^{3+}$ (0.79 ml) | 2 | 60.0 | 9200 | 7173 |
| 116 | Am-1, Am-24 (29:71)(0.21 ml) | EP-1 (1 ml) | $Fe^{3+}$ (0.79 ml) | >120 | 120.0 | 7000 | 6816 |
| 117 | Am-29, Am-24 (29:71)(0.21 ml) | EP-1 (1 ml) | $Fe^{3+}$ (0.79 ml) | 2 | 600.0 | 12200 | 3481 |
| 118 | Am-29, Am-22 (29:71)(0.21 ml) | EP-1 (1 ml) | $Fe^{3+}$ (0.79 ml) | 2 | 345.0 | 10400 | 5040 |
| 119 | Am-29, Am-27 (29:71)(0.21 ml) | EP-1 (1 ml) | $Fe^{3+}$ (0.79 ml) | 2 | 260.0 | 10000 | 180 |

The results in Table II exemplify the novel synergism, and its effect on viscosity, achieved in combining enhancer components of the invention. All of Examples 112–119 demonstrate surprising levels of viscosity which are unexpected based on the viscosities of the individual components on a same volume basis. In addition, the viscosities for each of the individual components separately have been calculated to take into account the relative contribution of each amine component in the mixture (see the column on the extreme right). In this way, a theoretical (or expected) value is obtained. The actual viscosities obtained in all of Examples 112–119 exceed the calculated viscosities.

For the following examples, the same experimental procedure as in Examples 1–103 was used. Differences in volumes and ratios employed are specified in each of the examples set forth in Table III.

TABLE III

EXAMPLES 120a–123d: EFFECT OF SYNERGISTIC PHOSPHATE ESTER MIXTURES ON GEL VISCOSITY

| Ex. | Enhancer (mixing ratio & vol. Added) | Phosphate | Salt | Closure Secs. | Viscosity Mins. | Viscosity Centipoises | Calculated Viscosity Based on Relative Contribution of Each Amine Component - in Centipoises (Expected) |
|---|---|---|---|---|---|---|---|
| 120a | Am-56, Am-3 (29:71)(0.42) | PE-1 (2 ml) | $Fe^{3+}$ (1.58 ml) | 2 | 1440+ (i.e., >24 hrs) | 40000 | |
| 120b | Am-56, Am-3 (29:71)(0.21) | PE-1 (1 ml) | $Fe^{3+}$ (0.79 ml) | 2 | 70.0 | 7000 | |
| 120c | Am-56, Am-3 (29:71)(0.11) | PE-1 (0.5 ml) | $Fe^{3+}$ (0.40 ml) | 2 | 15.0 | 2800 | |
| 120d | Am-56, Am-3 (29:71)(0.06) | PE-1 (0.25 ml) | $Fe^{3+}$ (0.20 ml) | >120 | 0.8 | 600 | |
| 121a | Am-56, Am-3 (29:71)(0.42) | (lll)(3b) (2 ml) | $Fe^{3+}$ (1.58 ml) | 2 | 1440+ | 31000 | |
| 121b | Am56, Am-3 (29:71)(0.21) | (lll) (3b) (1 ml) | $Fe^{3+}$ (0.79 ml) | 2 | 20.0 | 5200 | |
| 121c | Am-56, Am-3 (29:71)(0.11) | (lll) (3b) 0.5 ml | $Fe^{3+}$ (0.40 ml) | 3 | 12.0 | 2100 | |
| 121d | Am-56, Am-3 (29:71)(0.06) | (lll) (3b) 0.25 ml | $Fe^{3+}$ (0.20 ml) | 3 | 2.5 | 1200 | |

TABLE III-continued

EXAMPLES 120a–123d: EFFECT OF SYNERGISTIC PHOSPHATE
ESTER MIXTURES ON GEL VISCOSITY

| Ex. | Enhancer (mixing ratio & vol. Added) | Phosphate | Salt | Closure Secs. | Viscosity Mins. | Viscosity Centipoises | Calculated Viscosity Based on Relative Contribution of Each Amine Component - in Centipoises (Expected) |
|---|---|---|---|---|---|---|---|
| 122a | Am-56, Am-3 (29:71)(0.42) | EP-1 (2 ml) | $Fe^{3+}$ (1.58 ml) | 2 | 1260.0 | 45000 | |
| 122b | Am-56, Am-3 (29:71)(0.21) | EP-1 (1 ml) | $Fe^{3+}$ (0.79 ml) | 2 | 150.0 | 10600 | |
| 122c | Am-56, Am-3 (29:71)(0.11) | EP-1 (0.5 ml) | $Fe^{3+}$ (0.40 ml) | 2 | 10.0 | 3200 | |
| 122d | Am-56, Am-3 (29:71)(0.06) | EP-1 (0.25 ml) | $Fe^{3+}$ (0.20 ml) | >120 | 2.0 | 2000 | |
| 123a | Am-56, Am-3 (29:71)(0.42) | PE-1, (lll)(3b) (50:50) 2 ml | $Fe^{3+}$ (1.58 ml) | 2.0 | 1440+ | 76000 | 40000 |
| 123b | Am-56, Am-3 (29:71)(0.21) | PE-1, (lll)(3b) (50:50) 1 ml | $Fe^{3+}$ (0.79 ml) | 2.0 | 340 | 15400 | 7600 |
| 123c | Am-56, Am-3 (29:71)(0.11) | PE-1, (lll)(3b) (50:50) 0.5 ml | $Fe^{3+}$ (0.40 ml) | 3.0 | 30 | 4000 | 3300 |
| 123d | Am-56, Am-3 (29:71)(0.06) | PE-1, (lll)(3b) (50:50) 0.25 ml | $Fe^{3+}$ (0.20 ml) | >120 | 4.0 | 2400 | 800 |

The results in Table III exemplify the novel synergism, and its effect on viscosity, achieved in combining phosphate esters according to the invention. All of Examples 123a–123d demonstrate surprising levels of viscosity which are unexpected based on the viscosities of the individual components on a same volume basis. In addition, the viscosities for each of the individual components separately have been calculated to take into account the relative contribution of each phosphate ester in the mixture (see the column on the extreme right). In this way, a theoretical (or expected) value is obtained. The actual viscosities obtained in all of Examples 123a–123d are 190%, 202%, 121%, and 300%, respectively, of the calculated values.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What I claim is:

1. An enhancer composition for use in combination with a gellable liquid hydrocarbon, a phosphate ester, and a crosslinking agent, said enhancer composition comprising an oxyalkylated di $C_2$–$C_8$ alkyl amine and a second component selected from the group consisting of N,N-diloweralkyl fatty amine, oxyalkylated fatty amine and mixtures thereof.

2. The enhancer composition according to claim 1, comprising N,N-dibutyl amine ethoxylated with 1 mole of ethylene oxide and oxyethylated oleyl amine.

3. A synergistic amine enhancer composition useful in gelling compositions comprising N,N-dibutyl ethanol amine in combination with a second oxyalkylated amine enhancer comprising an ethoxylated $C_{16}$–$C_{18}$ alkyl amine having two moles of oxyethylene per mole of amine; an ethoxylated $C_8$–$C_{16}$ alkyl amine having two moles of oxyethylene per mole of amine; an ethoxylated $C_{18}$ alkenyl amine having two moles of oxyethylene per mole of amine; or an ethoxylated $C_{16}$–$C_{18}$ alkenyl amine having two moles of oxyethylene per mole of amine.

* * * * *